US008059287B2

(12) United States Patent
Ishii

(10) Patent No.: US 8,059,287 B2
(45) Date of Patent: Nov. 15, 2011

(54) IMAGE FORMING APPARATUS HAVING AN IMAGE FORMING PART THAT CAN BE SET IN A STANDBY STATE IN RESPONSE TO IMAGE FORMING OPERATION TO BE PERFORMED SUBSEQUENTLY

(75) Inventor: Shigeyuki Ishii, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 923 days.

(21) Appl. No.: 11/987,890

(22) Filed: Dec. 6, 2007

(65) Prior Publication Data

US 2008/0165377 A1 Jul. 10, 2008

(30) Foreign Application Priority Data

Dec. 14, 2006 (JP) .................................. 2006-337573
Jan. 29, 2007 (JP) .................................. 2007-017937

(51) Int. Cl.
*G06F 3/12* (2006.01)
*G06K 15/00* (2006.01)
(52) U.S. Cl. ...................... 358/1.14; 358/1.13; 358/1.15
(58) Field of Classification Search .................. None
See application file for complete search history.

(56) References Cited

U.S. PATENT DOCUMENTS

| 2003/0197886 A1* | 10/2003 | Fujinaga et al. | 358/1.14 |
| 2006/0210289 A1* | 9/2006 | Yamauchi et al. | 399/38 |
| 2006/0274348 A1* | 12/2006 | Suzuki | 358/1.13 |
| 2007/0009154 A1* | 1/2007 | Iwabayashi et al. | 382/176 |

FOREIGN PATENT DOCUMENTS

| JP | 62-187362 | 8/1987 |
| JP | 08-076538 | 3/1996 |
| JP | 2000-035705 | 2/2000 |
| JP | 3134501 | 2/2001 |
| JP | 2001-177676 | 6/2001 |
| JP | 2001177676 | * 6/2001 |
| JP | 2004-338265 | 12/2004 |
| JP | 2005-096165 | 4/2005 |
| JP | 2006-110940 | 4/2006 |
| JP | 2006-142770 | 6/2006 |
| JP | 2006-285294 | 10/2006 |

OTHER PUBLICATIONS

Japanese Office Action dated May 24, 2011.
Japanese Office Action dated Aug. 2, 2011.
Japanese Office Action dated Sep. 1, 2011.

* cited by examiner

*Primary Examiner* — Benny Tieu
*Assistant Examiner* — Haris Sabah
(74) *Attorney, Agent, or Firm* — IPUSA, PLLC

(57) ABSTRACT

An image forming part performs an image forming operation. A higher-order component sends an image forming request to perform the image forming operation of said image forming part. A control part controls the image forming part based on the image forming request received from the higher-order component. The control part controls the image forming part to perform a deactivation standby operation to stand by for a predetermined time while the image forming part is continuously set in an operating state after the image forming part completes the image forming operation, without querying the higher-order component about an image forming operation to be performed subsequently.

15 Claims, 15 Drawing Sheets

IMAGE FORMING APPARATUS HAVING AN IMAGE FORMING PART THAT CAN BE SET IN A STANDBY STATE IN RESPONSE TO IMAGE FORMING OPERATION TO BE PERFORMED SUBSEQUENTLY

BACKGROUND OF THE INVENTION

1. Field of the Invention

The present invention relates to image forming apparatuses and, more particularly, to an image forming apparatus that is capable of controlling a process time gap between an image forming operation and an image processing operation.

2. Description of the Related Art

In recent years, with progress in computerization of information, image forming apparatuses such as a printer, a facsimile, etc., which are used to output electronic information, have become indispensable devices. High-speed processing is required for image forming apparatuses such as a business-use image forming apparatus in a case where the image forming apparatus performs a large amount of image formation to be output or in a case where the image forming apparatus is shared by a large number of persons. In order to satisfy such a demand for high-speed operation, a method is suggested to attempt improvement in a throughput of an image forming process (for example, refer to Patent Document 1). In this method, an execution timing of a starting process and a stopping process of an image forming mechanism (a print engine) that actually performs the image forming process is optimized so as to improve throughput of the image forming process.

Patent Document 1: Japanese Laid-Open Patent Application No. 2001-177676

In an image forming apparatus disclosed in the above-mentioned Patent Document 1, when performing an image forming process by a monochrome print engine, a query is sent to a controller, which performs image processing, to determine whether an object of the print job subsequently supplied is a monochrome image or a color image. If the object of the print job is a monochrome image, the image processing is continued. On the other hand, if the object of the print job subsequently supplied is a color image, a print engine for color images is activated beforehand. Thereby, a time lag caused by a starting process of the print engine is eliminated when performing the subsequently supplied color image print job. Additionally, when performing the image forming process by the color image print engine, a query is sent to the controller for performing the image processing as to whether the object of the print job subsequently supplied is a monochrome image or a color image. If the object of the print job is a monochrome image, the operation of the color image print engine is stopped immediately after the print job is ended to save energy.

However, as an operation cycle of an image forming apparatus, it is typical to perform an image forming process by a print engine after performing image processing by a controller. In order to provide a function to send a query about contents of a print job from the print engine to a controller, a design change is required to a program for controlling the apparatus or a structure of the apparatus. However, providing such a function is not easy. Additionally, if the print engine sends a query about the job contents to the controller and the controller sends a reply about the job contents to the print engine, a communication load is naturally increased. However, it is not desirable to increase the communication load between the controller and the print engine since image data is being sent from the controller to the print engine.

In the meantime, many multi-function image forming apparatuses, such as a copy machine, a printer, or a multi-function peripheral (MFP) having a plurality of image forming functions, are provided with a function to operate parts and units necessary for a job being performed so as to eliminate waste energy. On the other hand, such an image forming apparatus is capable of concurrently processing a plurality of jobs that use different functions (parts and units) when used by a plurality of host apparatuses connected to a network or when having complex functions. Thus, a frequency of activating a common operation part shared by jobs has become high. Under such circumstances, if operations of the common functions and common parts or units are stopped each time one job is ended and the common parts or units are activated again from the stopped state, a waiting time is increased, which elongates a total process time of each job.

In order to solve such a problem, Patent Document 2 teaches a control technique to cause image formation of a plurality of sheets to be performed continuously while an image forming part is maintained in an activated state so as to achieve a high-speed image forming process and prevent waste operation of an operation part to save energy.

Patent Document 2: Japanese Laid-Open Patent Application No. 2000-35705

An image forming apparatus disclosed in Patent Document 2 is capable of performing monochrome mode and color mode image forming operations on recording media that are sequentially conveyed. In this image forming apparatus, a query is made as to whether the mode setting for a subsequent recording medium is a color mode, a monochrome mode or an unfixed mode so as to control operation (activation and waiting or rest) of a color image forming part and a monochrome image forming part in accordance with the mode setting. According to such a control, both a high throughput and a low operating cost can be achieved. The technique disclosed in Patent Document 2 is to optimize the control of operations (activation and waiting or rest) of the color image forming part and the monochrome image forming part that is performed between recording media in consecutive image forming operations. However, the technique does not include an inactivating operation of the color and monochrome image forming parts.

SUMMARY OF THE INVENTION

It is a general object of the present invention to provide a novel and improved image forming apparatus in which the above-mentioned problems are eliminated.

A more specific object of the present invention is to provide an image forming apparatus which can eliminate inefficiency due to a process time gap between an image processing time and an image forming time.

In order to achieve the above-mentioned objects, an image forming apparatus is provided, comprising: an image forming part that performs an image forming operation; a higher-order component that sends an image forming request to perform the image forming operation of the image forming part; and a control part that controls the image forming part based on the image forming request received from the higher-order component, wherein the control part controls the image forming part to perform a deactivation standby operation to stand by for a predetermined time while the image forming part is continuously set in an operating state after the image forming part completed the image forming operation, without querying the higher-order component about an image forming operation to be performed subsequently.

According to the present invention, the image forming apparatus may eliminate inefficiency due to a process time gap between an image processing time and an image forming time without a large design change to a conventional image forming apparatus.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of an image forming apparatus according to a first embodiment of the present invention. The image forming apparatus according to the first embodiment of the present invention optimizes a timing of inactivating an image forming part so as to improve throughput of the image forming process by performing an inactivating operation of the image forming part after waiting a passage of a predetermined time without immediately inactivating the image forming part after an image forming operation of one print job is completed by the image forming part.

Figure 1:
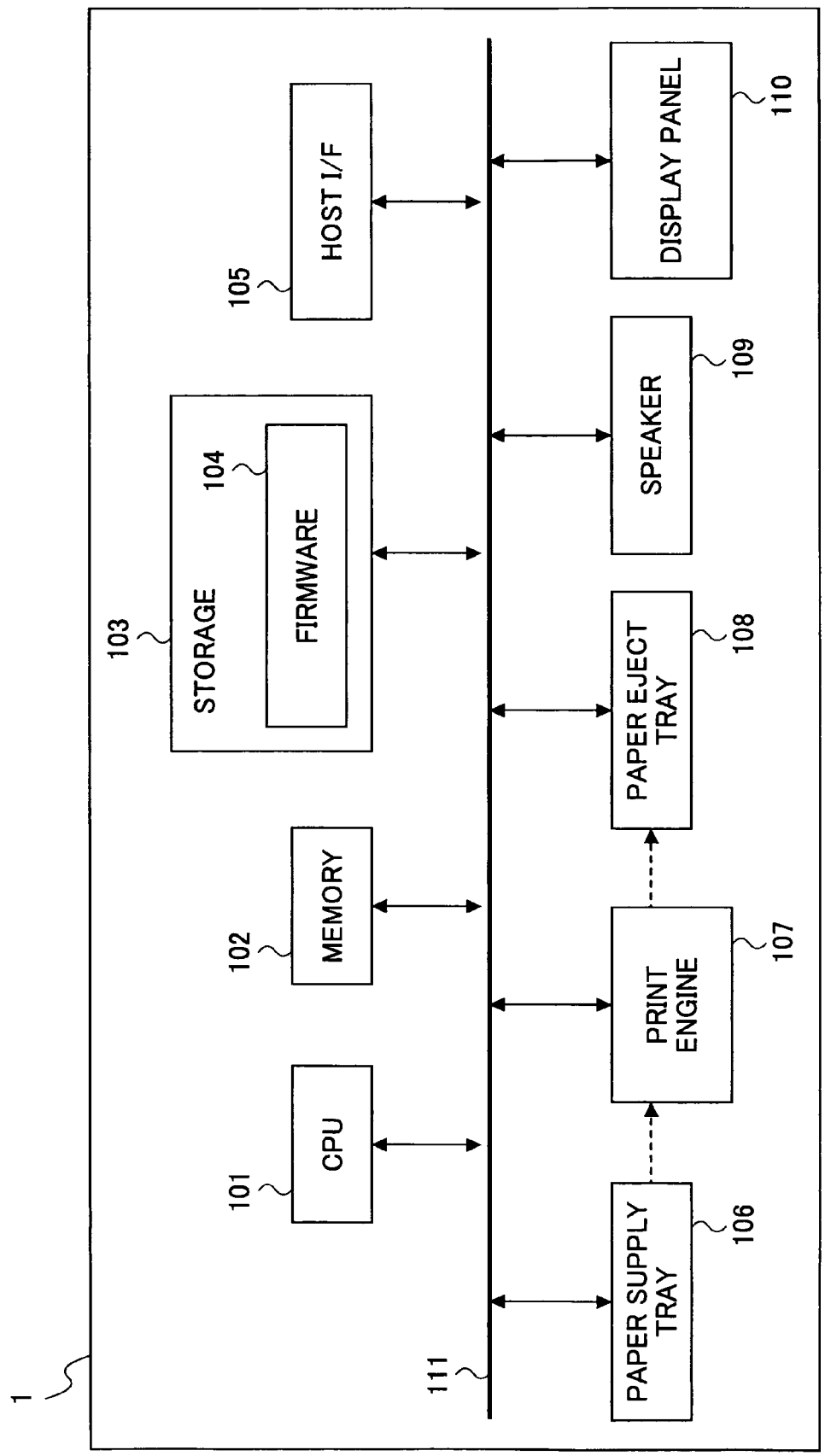
FIG. 1 is a hardware block diagram of an image forming apparatus according to a first embodiment of the present invention.

FIG. 1 is a hardware block diagram of the image forming apparatus 1 according to the first embodiment of the present invention. As shown in FIG. 1, the image forming apparatus 1 comprises a central processing unit (CPU) 101, a memory 102, a storage 103, a host interface (I/F) 105, a paper supply tray 106, a print engine 107, a paper eject tray 108, a speaker 109, a display panel 110, and a bus 111. It should be noted that, in FIG. 1, solid line arrows indicate electric connection, and dotted line arrows indicate a flow of a print paper.

Generally, a volatile memory is used for the memory 102. A control program such as firmware 104 stored in the storage 103 is loaded to the memory 102 so as to constitute a control part that controls an operation of the image forming apparatus 1 in accordance with the control of the CPU 101. The storage 103 includes a read only memory (ROM) or an electrically erasable and programmable ROM (EEPROM) and a nonvolatile recording medium such as a magnetic disk or an optical disc. The storage 103 stores various kinds of information used for operation of the image forming apparatus 1 in addition to the above-mentioned control program such as the firmware 104.

The host I/F 105 serves as a communication interface between the image forming apparatus 1 and other devices through a network. A print job sent by an external host apparatus is supplied to a control part of the image forming apparatus 1 through the host I/F 105 so that a print process is performed in accordance with instructions of the control part. In the print process, a print paper is fed from the paper supply tray 106 and an image is formed on the print paper by the print engine 107 serving as an image forming mechanism. The print paper having the formed image thereon is ejected onto the paper eject tray 108. The speaker 109 is an audio interface that notifies a user of a state of the image forming apparatus 1 by sound. The display panel 110 is an output interface for visually displaying a state of the image forming apparatus. The display panel 110 also serves as a touch panel, which is an input interface, for a user to operate the image forming apparatus 1. Those parts shown in FIG. 1 are mutually connected through the bus 111.

Figure 2:
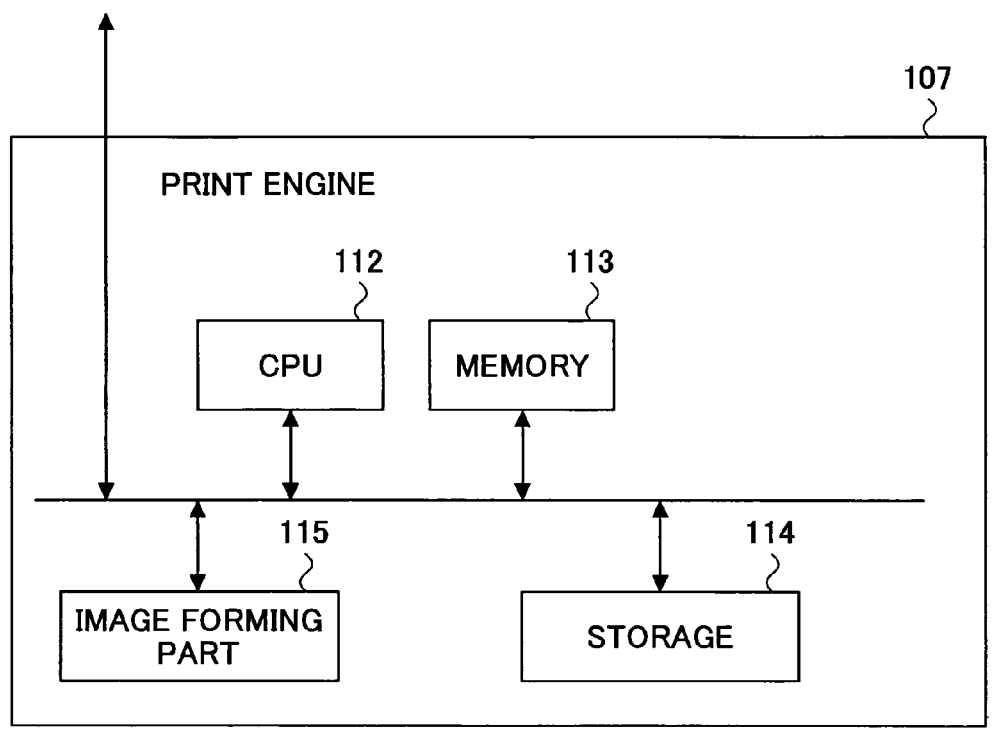
FIG. 2 is a block diagram of a print engine shown in FIG. 1.

A description will now be given, with reference to FIG. 2, of the print engine 107. As shown in FIG. 2, the print engine comprises a CPU 112, a memory 113, a storage 114 and an image forming part 115. The CPU 112, the memory 113 and the storage 114 have substantially the same functions as the corresponding parts shown in FIG. 1. The image forming part 115 actually performs an image forming process on an image forming medium such as a print paper or the like. The image forming part 115 according to the present embodiment is an image forming means for forming an image according to electrophotography. The image forming part 115 includes a photosensitive image carrier, an optical scanning unit that exposes the image carrier according to print data, and a development unit that develops electrostatic latent image formed on the image carrier.

A description will now be given, with reference to FIG. 3, of the image forming part 115 provided in the print engine 107 and a peripheral structure of the image forming part 115. The image forming part 115 according to the present embodiment is a color image forming part having four image forming units corresponding to color components, Yellow (Y), Magenta (M), Cyan (C) and Black (K). Each of the image forming units comprises a photosensitive member 71, a charger 72, a development unit 74, an intermediate transfer part 75 and a cleaning unit 78. The image forming units are arranged along an intermediate transfer belt 77. An optical scanning unit 73 is provided to project a light onto the photosensitive drum 71 of each image forming unit. An image transfer part 76 is provided along the intermediate transfer belt 77. A fixing part 79 fixes an image transferred onto a print paper by the image transfer part 76.

Figure 3:
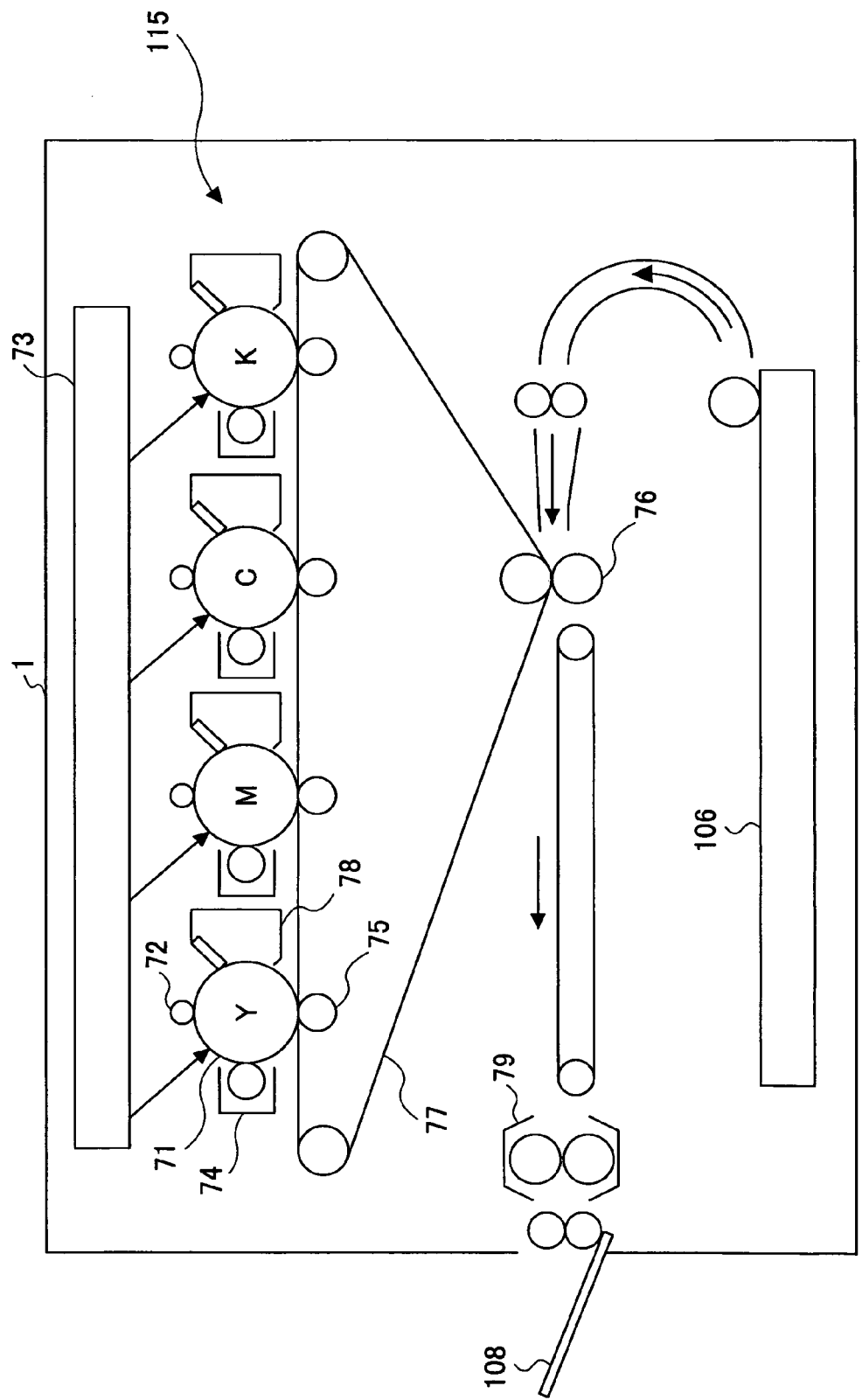
FIG. 3 is an illustration of the image forming apparatus shown in FIG. 1 including an image forming part and peripheral parts thereof.

In FIG. 3, the paper supply tray 106 accommodating print papers and the paper eject tray 108 onto which the print papers are ejected after image formation are shown as the peripheral parts of the image forming part 115. In the image forming process performed by each of the image forming units of the image forming part 115, the photosensitive member 71 rotates counterclockwise in FIG. 3, and a residual colorant (toner) attached to the photosensitive member 71 in a previous cycle is removed by the cleaning unit 78. Then, the photosensitive member 71 is electrically charged by the charger 72. Thereafter, the photosensitive member 71 is exposed by the optical scanning device 73 according to image data of an image to be formed, thereby forming an electrostatic latent image on the photosensitive member 71.

Next, the development unit 74 develops the electrostatic latent image formed on the photosensitive member 71 to form a toner image. The toner image formed on the photosensitive member 71 is transferred onto the intermediate transfer belt 77 by the intermediate transfer part 75. In this manner, the toner images of four color components, Y, M, C, and K, are sequentially transferred onto the intermediate transfer belt 77. The toner image transferred to the intermediate transfer belt 77 is transferred onto a print paper fed from the paper supply tray 106 by the image transfer part 76. The toner image transferred to the print paper is fixed by the fixing part 79. Then, the print paper on which the image is formed as mentioned above is ejected onto the paper eject tray 108.

A description will now be given, with reference to FIG. 4, of the function of the image forming apparatus 1 according to the present embodiment.

Figure 4:
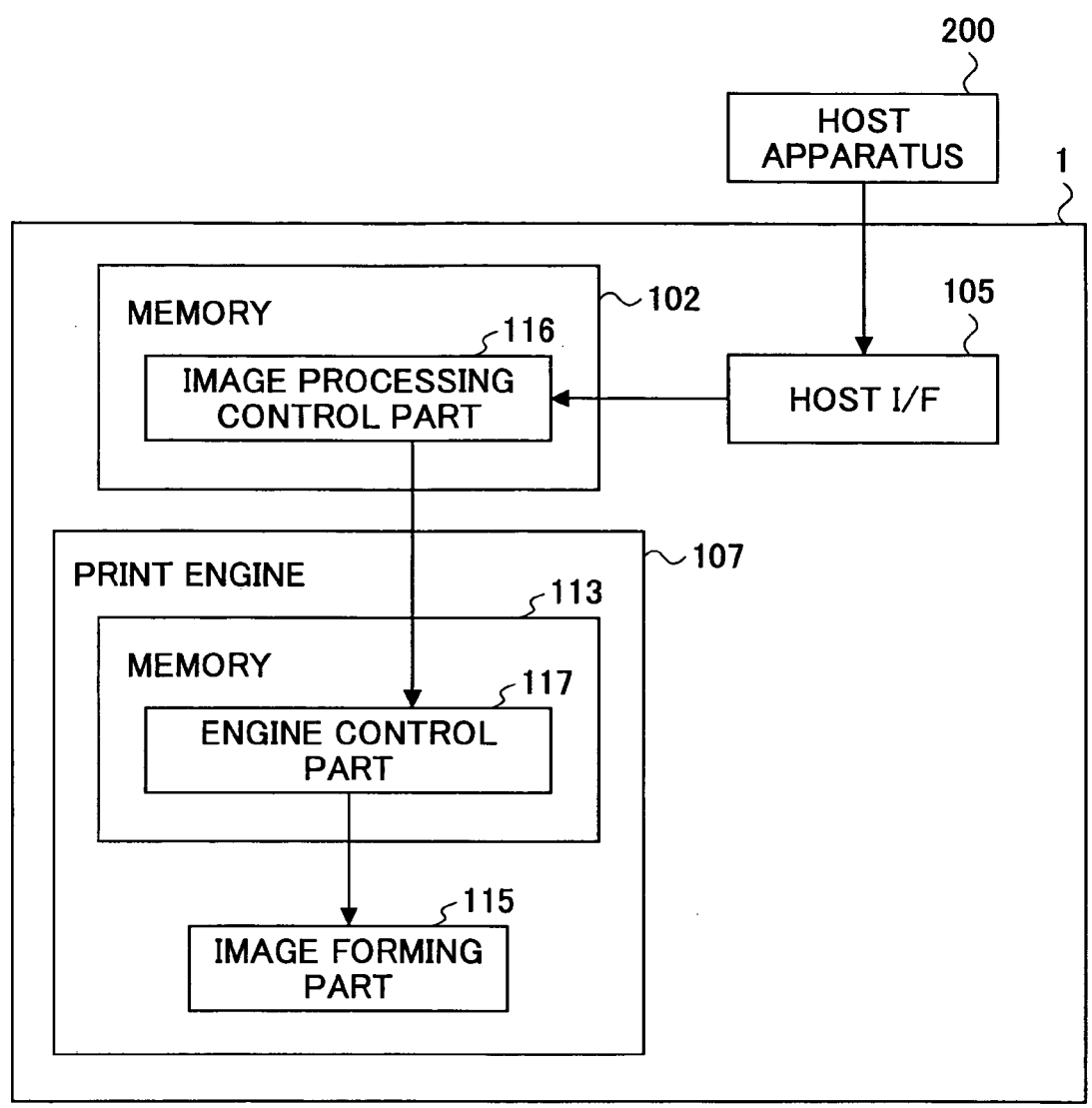
FIG. 4 is a functional block diagram of the image forming apparatus.

In the image forming apparatus 1, as shown in FIG. 4, the firmware 104 stored in the storage 103 is loaded into the memory 102, which constitutes an image processing control part 116 in association with the CPU 101. Also in the print engine 107, the firmware is loaded into the memory 113 constituting an engine control part 117 in association with the CPU 112. According to the function shown in FIG. 4, the image processing control part receives a print job, which was first received by the host I/F 105 from a host apparatus 200. The image processing control part then generates image forming data in accordance with image data contained in the print job. The engine control part 117 controls the image forming part 115 based on the image forming data received from the image processing control part 116 to cause the image forming part 115 to perform an image forming operation.

In another operation according to FIG. 4, the host I/F 105 receives the print job created by the host apparatus 200 and supplies the print job to the image processing control part 116. The image processing control part 116 performs image processing to generate image data contained in the received print job as image forming data. After the image forming data is generated and the image processing is completed, the image processing control part 116 sends the image forming data and an image forming request signal to the engine control part 117. Upon receipt of the image forming request signal and the image forming data, the engine control part 117 performs a starting process to change each component part contained in the image forming part 115 from a non-operating state to an operating state.

There are many similar processes to the processes described above, such as the process performed here, there are many processes such as, for example, a process of starting rotation of the photosensitive member 71, a process of starting rotation of the intermediate transfer belt 77, a process of contacting the photosensitive member 71 and the intermediate transfer belt 77 with each other, a process of charging the photosensitive member 71 by activating the charger 72, a process of charging a toner in the development unit 74, a process of starting rotation of a polygon mirror in the optical scanning device 73, a process of activating a laser diode (LD), a process of activating a discharge device arranged between the cleaning unit 78 and the charger 72.

After completion of the starting process of the image forming part 115, the engine control part 117 controls the image forming part 115 to start an image forming operation in accordance with the image forming data. When the image to be formed is transferred to the intermediate transfer belt 77, the engine control part 117 judges that the current print job is completed, and checks whether there is a following image forming request signal from the image processing control part 116. If the following image forming request signal is received from the image processing control part 116, the engine control part 117 continues to perform the image forming operation. On the other hand, if the following image forming request is not received from the image processing control part 116, the engine control part 117 stands by for a predetermined time period in a state where the image forming part 115 is activated. The predetermined time period to stand by is referred to as a deactivation standby time. If a following image forming request signal is received from the image processing control part 116 during the deactivation standby time, the engine control part 117 can start a next image forming operation smoothly and immediately without performing a starting operation of the image forming part 115, thereby reducing a time period until completion of the image formation.

On the other hand, if the engine control part 117 does not receive a following image forming request signal within the deactivation standby time, the engine control part 117 controls the image forming part 115 to perform a deactivation process to change each component part of the image forming part 115 from the operating state to the non-operating state. The processes performed here are reverse processes of the above-mentioned starting operation such as, for example, a process of stopping rotation of the photosensitive member 71, a process of stopping rotation of the intermediate transfer belt 77, a process of separating the photosensitive member 71 and the intermediate transfer belt 77 from each other, a process of ending charging the photosensitive member 71 by deactivating the charger 72, a process of ending charging a toner in the development unit 74, a process of stopping rotation of a polygon mirror in the optical scanning device 73, a process of deactivating a laser diode (LD), or a process of deactivating a discharge device arranged between the cleaning unit 78 and the charger 72.

After completion of one image forming operation, the engine control part 117 according to the present embodiment performs a deactivating operation without querying the image processing control part 116, which is a part of a higher-order component, about an image forming operation which is to be performed subsequently. That is, the deactivating operation by the engine control part 117 is performed according to the judgment of the engine control part 117, and after the engine control part 117 completes the one image forming operation, the deactivating operation is performed automatically if there is no image forming request received. Accordingly, the engine control part 117 may have only a function to receive signals such as an image forming request signal and image forming data from the image processing control part 116 as far as communication between the engine control part 117 and the image processing control part 116, which is a part of a higher-order component, is concerned, and there is no need to have a function to send a signal to the image processing control part 116. Thus, the print engine 107 serving as an image forming mechanism of the image forming apparatus 1 according to the present embodiment and the control method thereof can be applied to an existing image forming apparatus easily.

Figure 5:
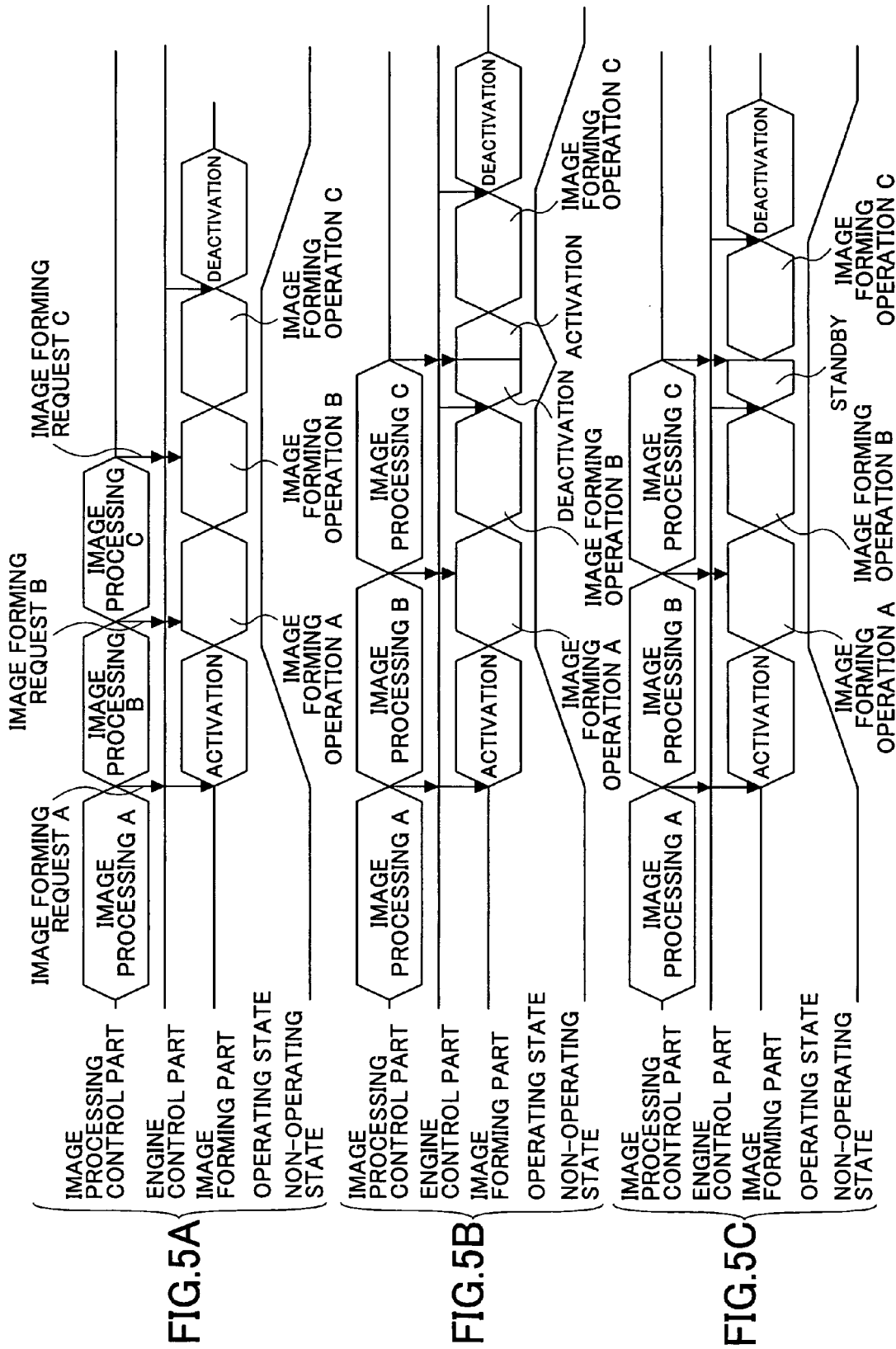
FIGS. 5A, 5B and 5C are time charts of image forming operations of the image forming part.

FIGS. 5A, 5B and 5C are time charts of image forming operations of the image forming part 115. In the image forming operations, the engine control part receives image forming requests A, B and C corresponding to image processing A, B and C performed by the image processing control part 116, which causes the image forming part 115 to perform image forming operations A, B and C. The time charts shown in FIGS. 5A, 5B and 5C indicate whether the image forming part 115 is in the operating state and indicate the operations performed by the image forming part 115. FIG. 5A shows an example where a time spent on the image processing relating to the image forming requests A, B and C is short. For this example, the control method according to the present embodiment is not needed. As shown in FIG. 5A, when the engine control part 117 receives the image forming request A, an activating operation of the image forming part 115 is started. After completion of the activating operation, the image forming part performs the image forming operation A corresponding to the image forming request A. After completion of the image forming operation A, the image forming part 115 performs the image forming operation B corresponding to the image forming request B that has been already received. Further, after completion of the image forming operation B, the image forming part 115 performs the image forming operation C corresponding to the image forming request C that has been already received.

FIG. 5B shows a case where a time spent on the image processing A, B and C is long and the control method of the present embodiment is not used. In FIG. 5B, the same process as that shown in FIG. 5A is performed after completion of the image forming operation A and until the image forming operation B corresponding to the already received image forming request B is performed. After completion of the image forming operation B, the engine control part 117 starts the deactivating operation of the image forming part 115 since there is no image forming request received. If the engine control part 117 receives an image forming request C during the deactivating operation of the image forming part 115, the engine control part 117 controls the image forming part 115 to stop the deactivating operation. Thus, the image forming part 115 stops the deactivating operation, and activates parts that have already been deactivated according to the deactivating operation (reactivating operation). After completion of the reactivating operation, the image forming part 115 performs the image forming operation C.

A time spent on the image processing in the image processing control part 116 changes according to image data to be processed. If it is complex and there is a large amount of image data, an amount of image processing for generating the image forming data is increased correspondingly. Accordingly, if there is a print job following, there may be a time lag generated between a time when the image forming part 115 completes the image forming operation B relating to one print job and a time when the image forming part 115 receives the image forming request C relating to the following print job. In such a case, if the deactivating operation of the image forming part 115 is started immediately after the image forming operation B relating to one print job is completed, it is needed to perform an activating operation of the image forming part 115 again in response to the reception of the following image forming request signal, thereby increasing the time to complete the image formation.

FIG. 5C shows a case where a time spent of the image processing B and C is long and the control method according to the present embodiment is used. In FIG. 5C, the same process as that shown in FIG. 5A is performed after completion of the image forming operation A and until the image forming operation B corresponding to the already received image forming request B is performed. After completion of the image forming operation B, the engine control part 117 waits for a deactivating operation of the image forming part 115 (deactivation standby operation) since no image forming request signal is received. If the engine control part receives the image forming request C within the deactivation standby time, the engine control part 117 causes the image forming part 115 to perform the image forming operation C. That is, a start of the deactivating operation is deferred for a predetermined time period after completion of an image forming operation (image forming operation B) relating to one print job. Accordingly, if a following image forming request (image forming request C) is received during the deactivation standby time, the following image forming operation (image forming operation C) can be performed without performing the deactivating operation of the image forming part 115. Thus, a time spent on the image forming operation can be reduced and throughput of the image forming apparatus 1 can be improved.

It should be noted that there may be a case where the deactivating operation of the image forming part 115 cannot be interrupted immediately after reception of an image forming request as shown in FIG. 5B. That is, when the deactivating operation is started, there may be a case where a reactivating operation must be performed after the deactivation of the entire image forming part 115 or a part of the image forming part 115 is completed even if an image forming request is received.

In such a case, the throughput of the image forming apparatus 1 can be improved further by applying the control method according to the present embodiment. Here, the time period to be set as the deactivation standby time is, for example, a maximum time that can be assumed as the image processing time of the image processing control part 116. Thus, the deactivating operation of the image forming part 115 by the engine control unit due to a time lag between consecutive print jobs can be prevented from being performed. In addition, the image processing time of the image processing control part 116 may be accumulated each time a print job is executed so that the deactivation standby operation is set based on the accumulated information such as a longest time period among the accumulated image processing times. Furthermore, a user may set the deactivation standby time based on actual feeling (estimate or approximation) of use. It should be noted that the deactivation of the image forming part 115 can be set immediately after one print job is completed by setting the deactivation standby time to zero.

Figure 6:
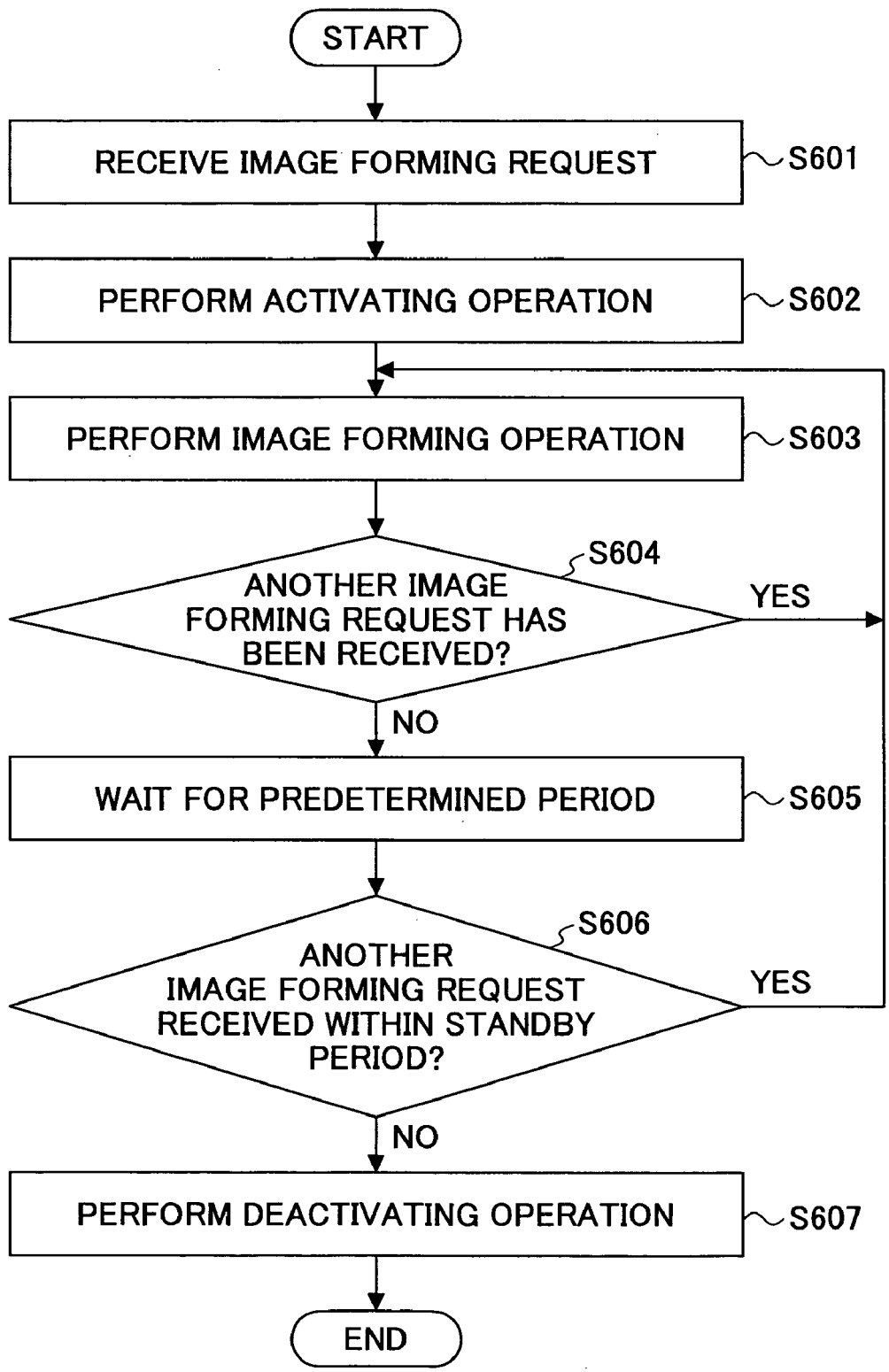
FIG. 6 is a flowchart of an operation of the image forming apparatus according to the first embodiment of the present invention.

FIG. 6 is a flowchart of an operation of the image forming apparatus according to the present embodiment. When the engine control part 117 receives an image forming request signal from the image processing control part 116 (step S601), the engine control part 117 controls the image forming part 115 to perform an activating operation (step S602). After completion of the activating operation, the image forming part 115 performs the image forming operation based on the subsequently received image forming request signal (step S603). After the image forming operation of the image forming part is completed, the engine control part 117 determines whether another image forming request has already been received (step S604). If another image forming request has not been received (NO of step S604), passage of the predetermined time period is allowed while the image forming part 115 is activated continuously (step S605). Then, it is determined whether another image forming request is received within the deactivation standby time during which time the image forming part 115 is activated continuously (step S606). If another image forming request is not received (NO of step S606), the engine control part 117 causes the image forming part 115 to perform the deactivating operation (step S607), and the process is ended.

On the other hand, if the engine control part 117 has received another image forming request at the time of completion of the image forming operation (YES of step S604), the routine returns to step S603 to perform an image forming operation based on the received image forming request. Thereafter, the process of step S604 and subsequent steps is repeated. Additionally, if another image forming request is received within the deactivation standby time during which the image forming part 115 is activated continuously (YES of step S606), the routine returns to step S603 to perform an image forming operation based on the received image forming request. Thereafter, the process of step S604 and subsequent steps is repeated.

As explained above, by using the image forming apparatus 1 according to the present embodiment, the timing of deactivating the image forming mechanism can be optimized, which improves throughput of the image formation. The control method according to the present embodiment is made possible by applying the control method only to the print engine 107 in the block diagram of the image forming apparatus 1 shown in FIG. 4. The controller such as the image processing control part 116 performing image processing can be a conventional structure. Thus, the control method according to the present embodiment can be achieved easily without much change. Additionally, since no new communication is needed between the engine control part 117 and the image processing control part 116, the control method according to the present embodiment can be achieved without increasing a communication load between the engine control part 117 and the image processing control part 116.

It should be noted that although a time lag between different print jobs was given as an example in the above description, such a time lag may change according to control methods by the image processing control apparatus 116 and the engine control part 117. That is, if the image processing control part 116 performs image processing for each print job to generate image forming data and send the image forming data to the engine control part 117, a time lag is generated between print jobs. However, if the image processing control part performs image processing for each page contained in a print job so as to create image forming data and sends the image forming data to the engine control part 117, there may be a time lag generated within one print job. In such a case, if the engine control part has not received an image forming request of a subsequent page at a time when an image forming operation of one page is completed, an effect the same as the above-mentioned effect can be obtained by deferring a deactivating operation of the image forming part 115 by a predetermined time period.

Additionally, although the description was made of the image forming apparatus using electrophotography in the present embodiment, the present invention may be applied to an image forming apparatus using other image forming method such as an inkjet method or the like and an effect identical to the present embodiment can be obtained by applying the present invention to such an image forming apparatus.

The image forming apparatus according to a second embodiment has basically the same hardware structure as the image forming apparatus 1 of the first embodiment, and descriptions thereof will be omitted. In the image forming apparatus according to the second embodiment, the engine control part 117 of the first embodiment further has a function of determining a necessity of a deactivating operation or setting a deactivation standby time based on a notification from the image processing control part 116, which is a part of a higher-order component. In the image forming apparatus according to the first embodiment, the engine control part 117 determines the deactivation standby time based on a maximum time period assumed as an image processing time of the image processing control part 116, a time determined by the accumulated information regarding an image processing time or a time arbitrarily set by a user. Thus, the deactivation standby time determined in the first embodiment is not based on an actual end time of the image processing currently being performed.

Figure 7:
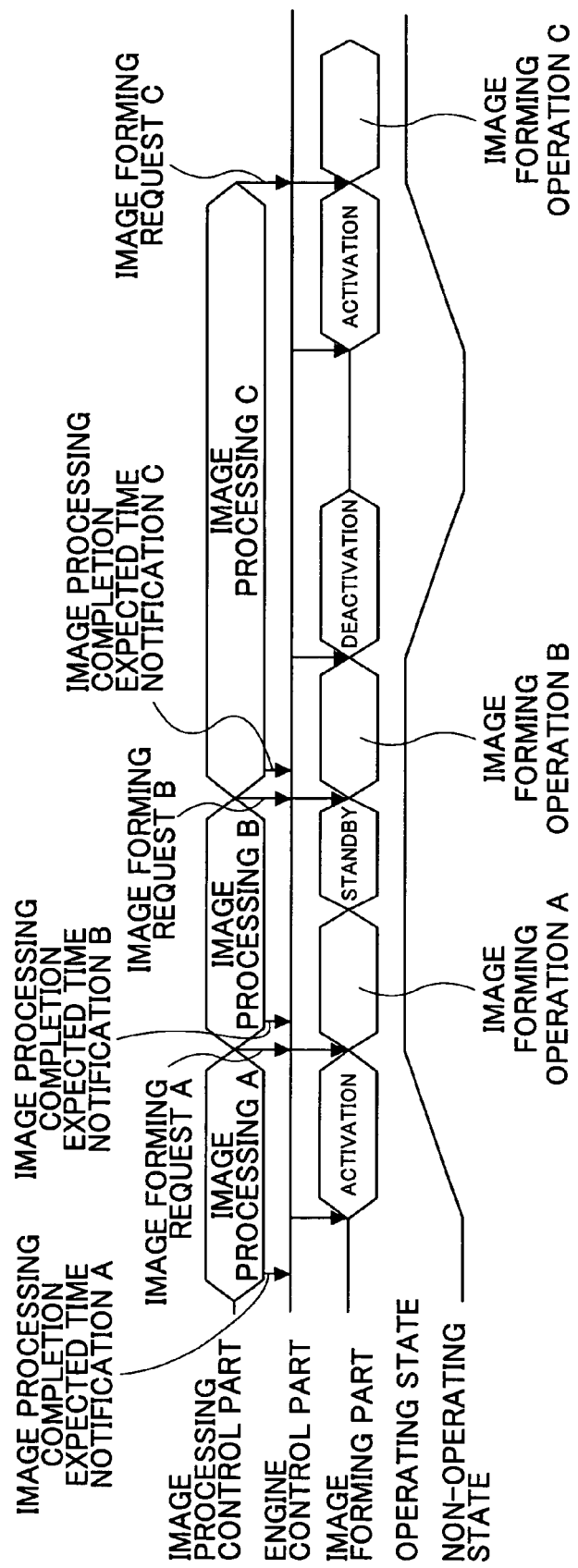
FIG. 7 is a time chart of operations of an image forming part and an engine control part of an image forming apparatus according to a second embodiment of the present invention.

FIG. 7 is a time chart of operations of the image forming part 115 and the engine control part 117. In FIG. 7, the engine control part 117 receives image forming requests A, B and C corresponding to image processing A, B and C performed by the image processing control part 116, and the image forming part 115 is made to perform the image forming operations A, B and C.

Figure 8:
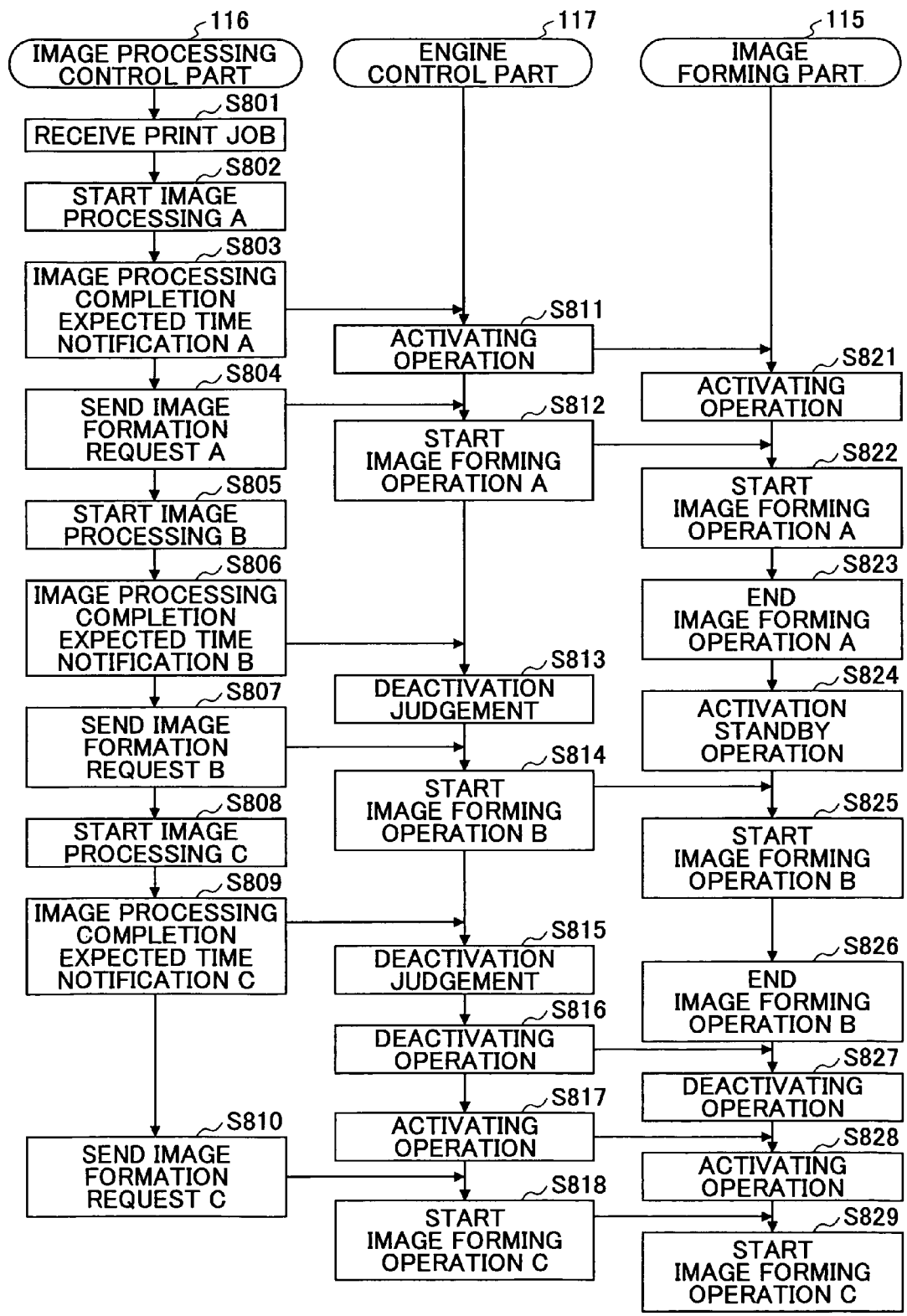
FIG. 8 is a flowchart of the operations performed by an image processing control part, the engine control part and the image forming part in a case shown in FIG. 7.

FIG. 8 is a flowchart of the operations of the image processing control part 116, the engine control part 117 and the image forming part 115 in the case shown in FIG. 7. As shown in FIG. 8, the image processing control part 116 receives a print job from a host apparatus (step S801), and starts the image processing A (step S802). Then, the image processing control part 116 computes a processing time required for image processing A and notifies the engine control part 117 of the acquired processing time as an image processing completion expected time notification A (step S803). The engine control part 117 causes the image forming part 115 to perform an activating operation in accordance with the time at which the image forming request A is received based on the received image processing completion expected time notification (steps S811, S821). The image processing control part 116 sends the image forming request A immediately after the image processing is completed (step S804). Upon receipt of the image forming request A, the engine control part 117 causes the image forming part 115 to perform the image forming operation A (steps S812, S822). Since the activating operation of the image forming part 115 has already been completed under the control of the engine control part 117 in response to the timing of the reception of the image forming request A, the image forming part 115 can start the image forming operation smoothly and immediately (step S822).

After completion of the image processing A, the image processing control part 116 starts image processing B (step S805). Also in the image processing B, a process time needed for the image processing B is computed first, and the engine control part 117 is notified of the acquired process time as an image processing completion expected time notification B (step S806). Then, the engine control part 117 compares the received completion expected time value with a predetermined threshold value so as to determine whether to deactivate the image forming part 115 or stand by without performing the deactivating operation after completion of the image forming operation (step S813). If the completion expected time value is smaller than the predetermined threshold value, the engine control part 117 stands by without deactivating the image forming part 115 after completion of the image forming operation currently being performed by the image forming part 115 so as to prepare for the subsequent image forming request B.

On the other hand, if the completion expected time value is equal to or greater than the predetermined threshold value, the engine control part 117 deactivates the image forming part 115 after completion of the image forming operation currently being performed, and causes the image forming part 115 to perform an activating operation in response to a timing at which the subsequent image forming request B is expected to be received. Here, it is assumed that the completion expected time value is smaller than the predetermined threshold value. That is, after the engine control part 117 received the image processing completion expected time notification B, the engine control part 117 does not cause the image forming part 115 to perform a deactivating operation. Thus, after the image forming operation A is completed (step S823), the image forming part 115 performs a deactivation standby operation while the operating state is maintained (step S824).

After completion of the image processing B, the image processing control part 116 sends the image forming request B to the engine control part 117 (step S807). Then, upon receipt of the image forming request B, the engine control part 117 causes the image forming part 115 to perform the image forming operation B (steps S814, S825). At this time, because the image forming part 115 is standing by in the operating state after completion of the image forming operation A, the image forming part 115 can start the image forming operation B immediately and smoothly (step S825). After the image processing B is completed, the image processing control part 116 starts the image processing C (step S308). Also in the image processing C, a process time needed for the image processing C is computed first, and the engine control part 117 is notified of the acquired process time as an image processing completion expected time notification C (step S809). Then, the engine control part 117 determines whether to deactivate the image forming part 115 or stand by without performing the deactivating operation based on the received completion expected time value (step S815). Here, it is assumed that the completion expected time value of the image processing C is equal to or greater than the predetermined threshold value. That is, after the engine control part 117 received the image processing completion expected time notification C, the engine control part 117 controls the image forming part 115 to be deactivated into a non-operating state (steps S816, S827). Therefore, the image forming part 115 is prevented from being set in an unnecessary operating state, which saves energy consumed by the image forming apparatus. Additionally, the engine control part 117 controls the image forming part 115 in response to the timing at which the image forming request C is expected to be received based on the received completion expected time value in order to activate the image forming part 115 into an operating state (steps S817, S828).

After completion of the image processing C, the image processing control part 116 sends the image forming request C to the engine control part 117 (step S810). Upon receipt of the image forming request C, the engine control part 117 controls the image forming part 115 to perform the image forming operation C (steps S818, S829). At this time, the activating operation of the image forming part 115 is completed under the control of the engine control part 117 in response to a timing at which the image forming request is received. Thus, the image forming part 115 can start the image forming operation C immediately and smoothly (step S829).

As mentioned above, the image forming apparatus according to the present embodiment notifies the print engine 107 of the time period needed to complete the image processing. Therefore, the print engine 107 can further optimize the timing of activation and deactivation of the image forming part 115.

It should be noted that the engine control part 117 may determine the deactivation standby time based on the received completion expected time. For example, after the engine control part 117 determines execution of the deactivation standby operation, if the image processing is not completed due to some problems such as a failure in the image processing control part 116, and if the engine control part 117 performs the deactivating operation without setting the deactivation standby time, the image forming part 115 continuously stands by in the operating state. However, since the deactivation standby time is determined based on the completion expected time, the engine control part 117 deactivates the image forming part 115 after the deactivation standby time has passed, which prevents the problem that the image forming part 115 continuously stands by in the operating state. It should be noted that the deactivation standby time determined based on the completion expected time is preferably set to a time period longer than the completion expected time in consideration of a case where an actual time spent of the image processing is longer than the computed value (completion of the image processing is delayed).

Figure 9:
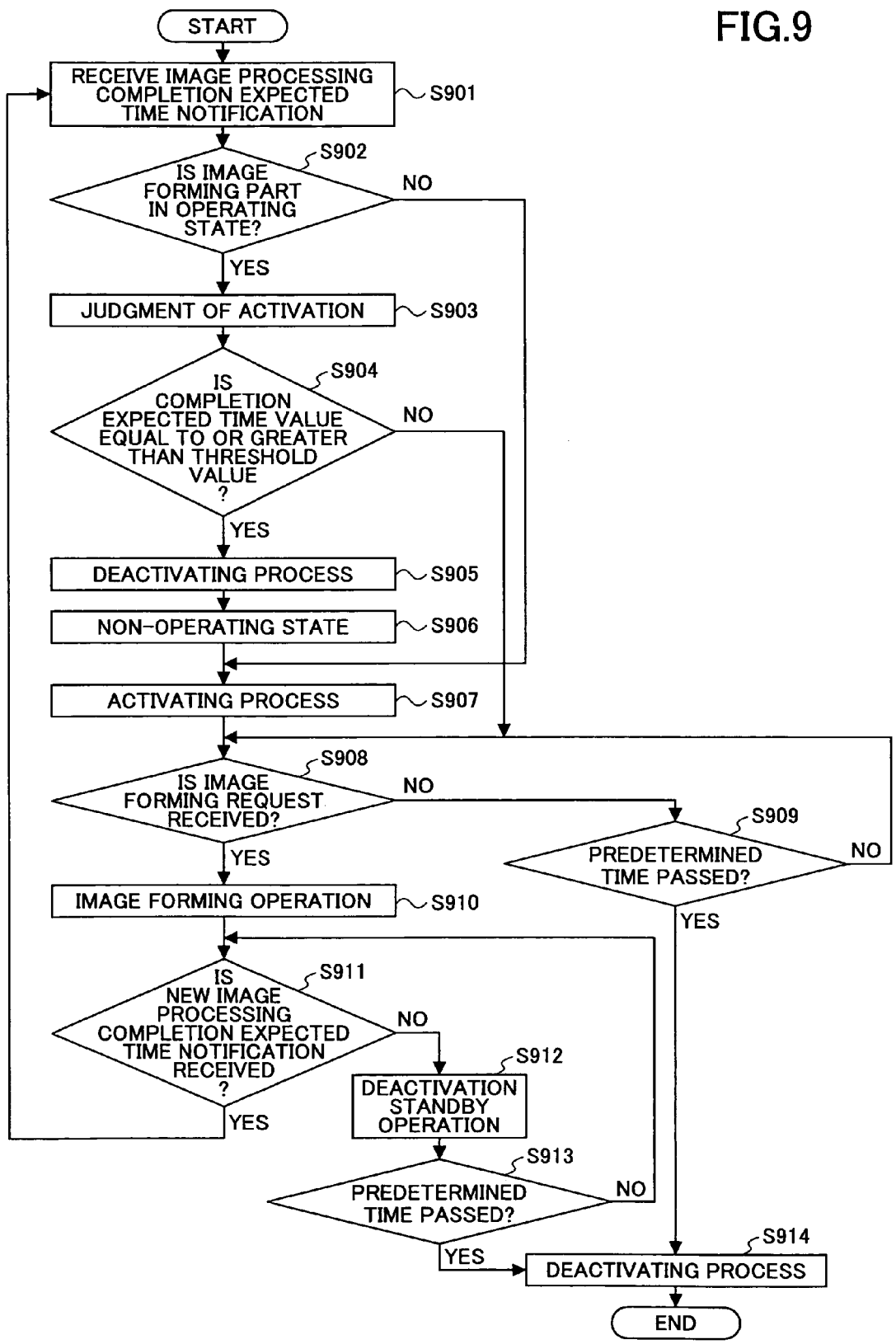
FIG. 9 is a flowchart of an operation of the engine control part according to the second embodiment of the present invention.

FIG. 9 is a flowchart of an operation of the engine control part 117 according to an embodiment of the present invention. As shown in FIG. 9, the engine control part 117 receives the image processing completion expected time notification from the image processing control part 116 (step S901). Then the engine control part 117 determines whether or not the image forming part 115 is performing an image forming operation or a deactivation standby operation (step S902). If the image forming part 115 is performing an image forming operation or a deactivating operation (YES of step S902), the engine control part 117 makes a judgment whether to perform a deactivating operation (step S903). Then, the engine control part 117 determines whether or not the completion expected time value is equal to or greater than the predetermined threshold value (step S904). If the completion expected time value is equal to or greater than the predetermined threshold value (YES of step S904), the engine control part 117 controls the image forming part 115 to perform the deactivating operation (step S905).

It should be noted that if the image forming part 115 is performing the deactivation standby operation, the process of step S905 is performed immediately, and if the image forming part 115 is performing the image forming operation, the process of step S905 is performed after the image forming operation. That is, the engine control part 117 is capable of cancelling execution of the deactivation standby operation in accordance with time information regarding the completion expected time. After the image forming part 115 is deactivated (step S905) and is set in the non-operating state (step S906), the engine control part 117 controls image forming part 115 in response to the time at which the subsequent image formation is expected to be received based on the image processing completion expected time received in step S901 to perform the activating process (step S907). It should be noted that if the image forming part 115 is in the non-operating state (NO of step S902), the engine control part 117 controls the image forming part 115 in response to the time at which the image forming request is expected to be received in order to perform the activating operation of the image forming part 115 (step S907).

Thereafter, the engine control part 117 determines whether the image forming request is received (step S908). If the image forming request is received (YES of step S908), the engine control part 117 causes the image forming part to perform the image forming operation (step S910). Then, the engine control part 117 determines whether a new image processing completion expected time notification is received (step S911). If the engine control part 117 received a new image processing completion expected time notification (YES of step S911), the routine returns to step S901 to repeat the process after step S901.

On the other hand, if the engine control part 117 did not receive a new image processing completion expected time notification (NO of step S911), the engine control part 117 causes the image forming part 115 to perform a deactivation standby operation (step S912). Then, the engine control part 117 determines whether or not a predetermine time has passed (step S913) since the deactivation standby operation is started. If the predetermine time has passed (YES of step S913), the engine control part 117 controls the image forming part 115 to perform the deactivating process (step S914), and the routine is ended. If the predetermine time has not passed (NO of step S913), the routine returns to step S911 to determine again whether a new image processing completion expected time notification is received.

As explained above, the image forming apparatus according to the present embodiment can further optimize the timing of activation or deactivation of the image forming mechanism based on the time period needed for generating image forming data, thereby improving a throughput of the image forming process.

It should be noted that the image processing control part 116 always notifies the engine control part 117 of the image processing completion expected time in the above-mentioned embodiment. It is not always necessary to notify the image processing completion expected time. For example, the image processing control part 116 computes the image processing completion expected time and, thereafter, compares the result of computation with the predetermined threshold value. The image processing control part notifies the engine control part 117 of the result of comparison only when the expected completion time value is equal to or greater than the predetermined threshold value. For example, in the case of image processing B shown in FIG. 5C, there is no need to perform the deactivating operation because the time at which the image forming operation A is completed is later than the time at which the image processing B is completed. Therefore, in this example, there is no need to notify the engine control part 117 of the completion expected time of the image processing B. In such a case, it dose not make any sense to send a notification of the completion expected time from the image processing control part 116 to the engine control part 117. Thus, whether sending the image processing completion expected time notification is necessary is determined in accordance with the completion expected time in order to eliminate an unnecessary communication being performed.

For a third embodiment of the present invention, the image forming apparatus has the same basic hardware structure as the image forming apparatus according to the first embodiment, and a description thereof will be omitted. The image forming apparatus according to the third embodiment has a main controller which controls operations of the entire image forming apparatus. The main controller receives a process request command through the host I/F or an operation unit such as an operation panel. The main controller executes control programs contained in the operation unit in accordance with the received command in order to perform a process requested by the process request command by controlling and managing devices and mechanisms necessary for performing the process.

When a print request is made through an input operation of the operation panel or from a host apparatus through the host I/F, the main controller receives the print request and manages data to be processed. The data to be processed includes setting data which corresponds to processing conditions indicated in the print request, print data input together with the print request or print data of a document stored in a database designated by the print request. Hereinafter, the main controller performing such a managing function may be referred to as a print request management part.

The print request management part manages the data to be subjected to a print process on an individual recording paper basis (unit of page) from a time at which the print request is received and until a time when the print process is ended. That is, when performing a printing operation for a plurality of recording papers (a plurality of pages), the print request management part receives the print request corresponding to the number of pages to be printed, generates image forming data according to a setting based on print data of the printed object for each page, and manages an image forming operation to form an image on each recording paper.

Figure 10:
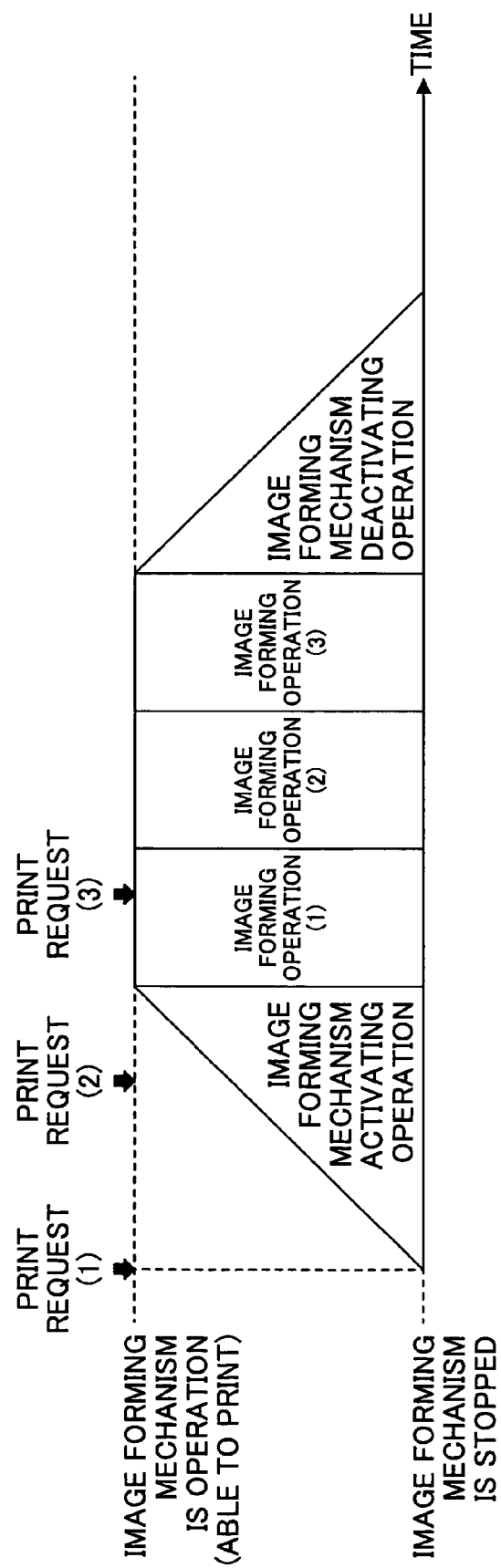
FIG. 10 is a time chart of an example of an image forming operation managed by a print request management part to form images on a plurality of pages consecutively.

FIG. 10 is a time chart of an example of an image forming operation managed by the print request management part to form images on a plurality of pages consecutively. After the input operation of the print request command is performed, the print request management part sends an instruction to perform a process to an image processing control part in order to convert print data or image data designated in the received command into image forming data used by an image forming part. Thereafter, the print request management part sends a print request to the image forming part at a time when the image forming data is generated in the image processing control part.

Upon receipt of the print request issued by the image request management part, the image forming part in which the image forming mechanism is in a stopped state starts an activating operation to set the image forming mechanism in a state where an image forming operation is performed as shown in FIG. 10. The image forming mechanism starts the image forming operation immediately after the activating operation is completed. The image forming operation for one sheet (one page) is ended at a time when the formed image is transferred onto the intermediate transfer belt.

In the example shown in FIG. 10, a subsequent print request (2) is received during an activating operation that is instructed in a print request (1). Thus, after an image forming operation (1) is ended, a subsequent image forming operation (2) is started immediately. Similarly, since a subsequent print request (3) is received during the image forming operation (1), a subsequent image forming operation (3) is started immediately after the image forming operation (2) is ended. As mentioned above, if the print request is sent from the print request management part, the image forming operation is continuously performed. Then, if there is no print request issued during the image forming operation (3) as shown in FIG. 10, the image forming mechanism is stopped at a time when the image forming operation (3) is ended. That is, the operation of the image forming part is controlled so that a deactivating operation of the image forming mechanism is started at the time of completion of the image forming operation (3) in order to stop the operation of the image forming part.

Figure 11:
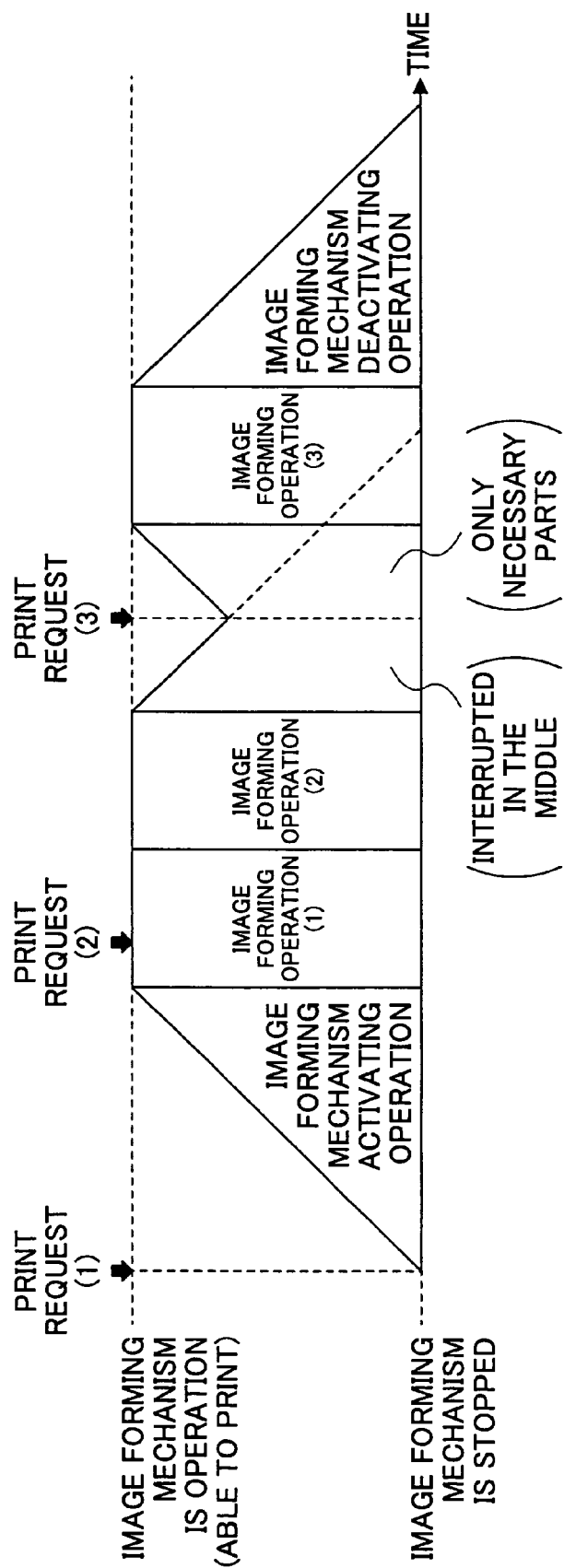
FIG. 11 is a time chart of an example of an image forming operation in which a print request is sent after the end of a preceding image forming operation.

The example of the operation shown in FIG. 10 is a case where an image processing of preceding image forming is ended within a normal time period and the image forming operation is continued without problems. However, the time needed for image processing of the image forming data varies depending on print data. Thus, there may be a case, as shown in FIG. 11, where a print request (3) is sent after the end of the preceding image forming operation (2) even if the image processing for the image forming operation to be performed subsequently is continuous with the preceding image processing. In such a case, a deactivating operation of the image forming mechanism is started at the time when the preceding image forming operation (2) is ended. Thereafter, since the print request (3) is sent late during the deactivating operation of the image forming mechanism, the deactivating operation is interrupted at the time when the print request (3) is received and an activating operation is started immediately to perform the image forming operation (3).

However, if the deactivating operation is interrupted and an activating operation is started immediately as in the case shown in FIG. 11, an unnecessary deactivating operation and reactivating operation are performed, which causes the control procedure to become complicated.

Thus, the present embodiment provides a simple control procedure, if an issuance of a print request is delayed from a timing that allows a normal operation, in order to maintain a high-speed image forming process and save energy consumed by the unnecessary activating and deactivating operations. In order to implement such a control method, according to the present embodiment, the image forming mechanism of the image forming part is caused to stand by in an operating state for a predetermined time period, and a deactivating operation of the image forming mechanism is started after a standby time has passed. In addition to the above-mentioned setting control of the standby time, the deactivating operation of the image forming mechanism is caused to be completed without interruption.

A description will now be given of examples of the image forming operation according to the present embodiment.

<Continuous Image Forming Operation (I) with Setting of a Standby Time>

Figure 12:
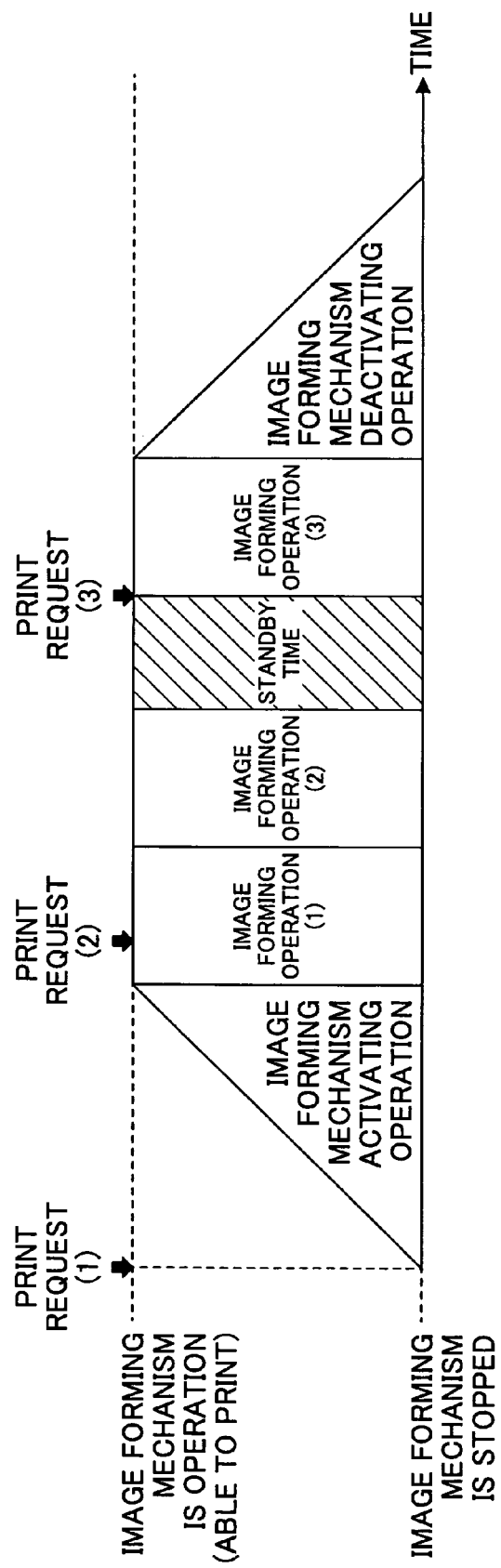
FIG. 12 is a time chart of an example of an image forming operation performed in the image forming part according to a third embodiment of the present invention.
Figure 13:
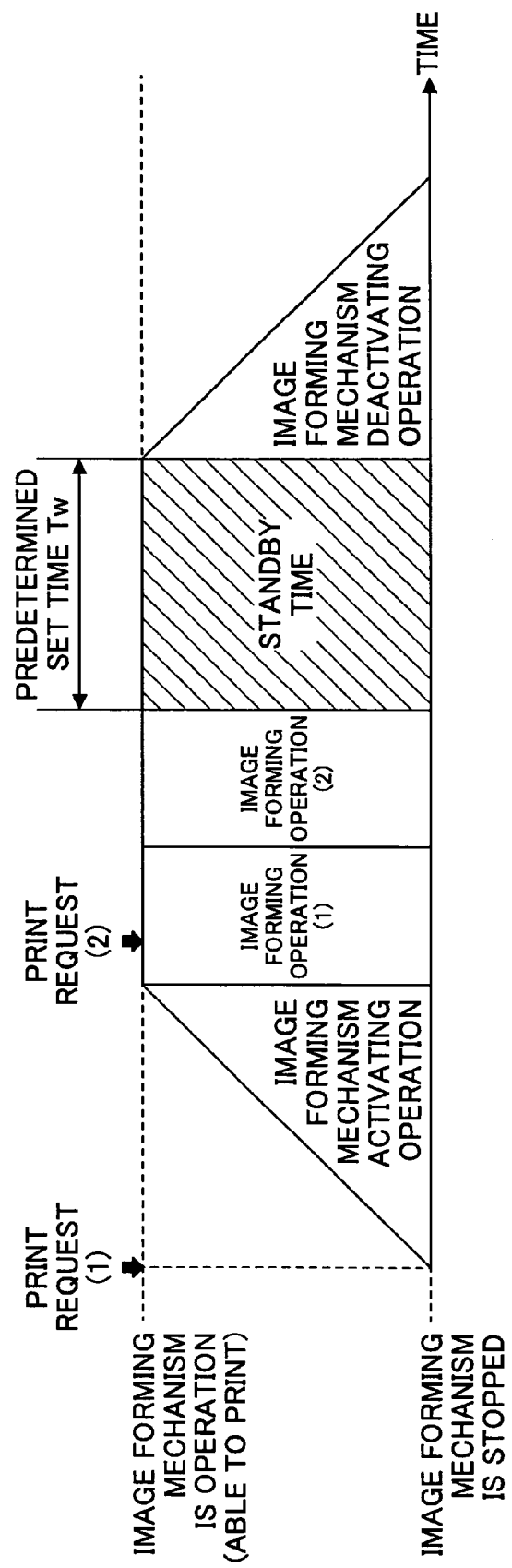
FIG. 13 is a time chart of another example of the image forming operation performed by the image forming part according to the third embodiment of the present invention.

FIGS. 12 and 13 are time charts of image forming operations performed by the image forming part according to the present embodiment with a standby time being set. In FIGS. 12 and 13, a relationship is shown between a timing of sequentially receiving a plurality of print requests and an operating state of the image forming mechanism of the image forming part. As shown in FIG. 12, when the image forming part, which is in a state where the image forming mechanism therein is stopped and receives a print request (1), the image forming part starts an activating operation to activate the image forming mechanism to change from a stopped state into a print state. Immediately after the activating operation is completed, the image forming part starts an image forming operation (1) corresponding to the print request (1). The image forming process corresponding to a single sheet is ended when a formed image is transferred onto an intermediate transfer belt.

In the example shown in FIG. 12, the image forming part receives a print request (2) in the middle of the image forming operation (1) being performed. Thus, immediately after the image forming operation (1) is completed, an image forming operation (2) corresponding to the subsequent print request (2) is started. Thereafter, in the case shown in FIG. 12, the image forming operation is completed while no subsequent print request is received. At this time, in the present embodiment, a deactivating operation of the image forming mechanism is not performed and the image forming mechanism is caused to stand by for a predetermined set time Tw, a set standby time while maintaining the image forming mechanism being set in the operating state. It should be noted that the operation thus far is also performed in the example shown in FIG. 13.

If the image forming part does not receive a new print request within the set standby time, this means that there is no need to perform a continuous image forming operation. Thus, as shown in FIG. 13, the image forming part starts a deactivating operation of the image forming mechanism to stop the image forming mechanism when the predetermined set time Tw has passed. It should be noted that even if a new print request is received during the deactivating operation, the deactivating operation is not interrupted and is continued until the image forming mechanism is deactivated.

On the other hand, for example, there may be a case where the image processing of image forming data of a preceding image forming operation takes a long time. In such a case, an issuance of a subsequent print request (3) is delayed and the print request (3) is received during the set standby time. As a result, because the print request (3) is received while the image forming mechanism is in a standby state, the image forming mechanism immediately starts the image forming operation (3).

Thereafter, according to the control of the present embodiment, if there is no subsequent print request during the image forming operation (3), a deactivating operation of the image forming mechanism is started at a time when the image forming operation (3) is ended. That is, the operation of the image forming part is controlled so that when the image forming operation (3) is ended, the activating operation of the image forming mechanism is performed immediately to deactivate the image forming mechanism. Also at this time, even if a new print request is received during the deactivating operation, the deactivating operation is not interrupted and is continued until the image forming mechanism is deactivated.

As mentioned above, by performing the control operation shown in FIGS. 12 and 13, even if an issuance of an image forming request is delayed from a time at which a normal continuous image forming operation can be performed, the image forming part can carry out an image forming operation immediately. Thus, by setting an appropriate set time to the standby time, energy consumption by an unnecessary operation of the image forming part can be minimized.

In addition to the control of setting the standby time, the deactivation of the image forming mechanism is made to be an operation that ended without interruption. Thus, the operation procedure is simplified. According to this control, a process load of the print request management part (controller) is reduced, and reliability of the operation can be improved because an error does not tend to occur in the operation.

<Setting and Changing a Condition of Standby Operation>

In the above-mentioned control operation of the continuous image forming operation, it is preferable to permit a change and an adjustment of the operating condition including whether to cancel the standby operation in accordance with the use condition of the image forming apparatus. The use condition may include whether the standby operation is used and what setting time is appropriate for the standby time when the standby operation is needed. Thus, in the present embodiment, means for changing and adjusting the operating condition by a manager or a user who knows the use condition of the image forming apparatus is provided to the image forming apparatus. That is, an operation unit or element used for the change and adjustment is added to a part of the property usually used in a conventional image forming apparatus such as a printer so that a setting condition can be input by an operation of a user through a user interface (UI) provided in the image forming apparatus. For example, an operation mode which a user can be selected or a setting condition is displayed by being related with a key on a graphical user interface (GUI) input screen so as to input a selected operating mode or a setting condition by operating the key. Whether to perform or cancel a standby operation is selected by an input to an ON/OFF check box displayed on an operation screen. Additionally, setting of the standby time may be done by inputting a numerical value to the operation screen or checking a check box, by which the standby time may be changed by an appropriate time step provided on the operation screen.

As mentioned above, when an operation mode for determining whether the standby operation is performed is set and the operation time is set, upon receipt of the input, the main controller sets those settings as a control condition to the print request management part. By enabling the change and adjustment of the setting of the standby operation condition, an unnecessary operation can be eliminated in response to a use condition, thereby minimizing energy consumption by the unnecessary operation of the image forming part and achieving a high-speed process.

<Continuous Image Forming Operation (II) with a Setting of a Standby Time>

Figure 14:
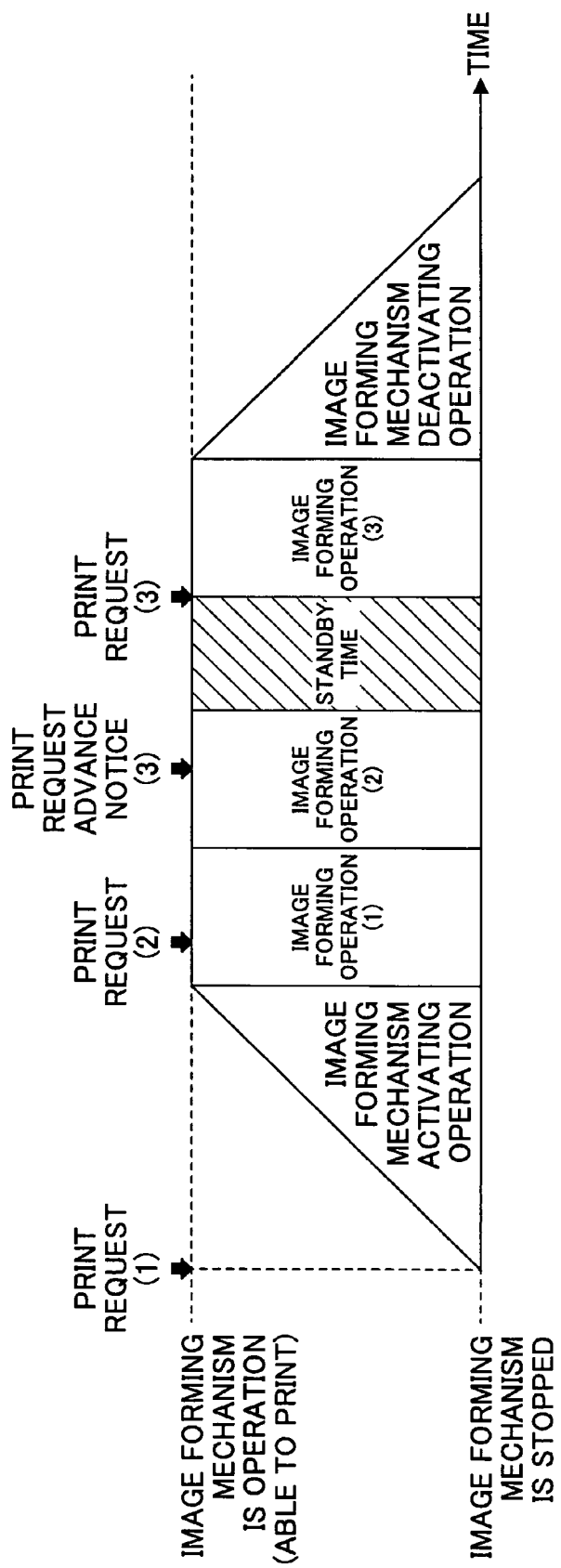
FIG. 14 is a time chart of a further example of the image forming operation performed by the image forming part according to the third embodiment of the present invention.

FIG. 14 is a time chart of another example of image forming operations performed by the image forming part according to the present embodiment with a standby time being set. Similar to FIGS. 12 and 13, FIG. 14 shows a relationship between a timing of sequentially receiving a plurality of print requests and an operating state of the image forming mechanism of the image forming part.

In this example, the print request management part issues a print request in the same manner as the above-mentioned continuous image forming operation (I). Furthermore, the print request management part issues a print request advance notice. The print request advance notice is issued so as to announce in advance that a print request cannot be issued at a timing at which a normal operation can be performed due to a long processing time of image forming data so that a standby operation of the image forming part to maintain the image forming part in an operating state is started upon receipt of the advance notice.

As shown in FIG. 14, when the image forming part, which is in a state where the image forming mechanism therein is stopped, received a print request (1) issued from the print request management part, the image forming part starts an activating operation to activate the image forming mechanism to change from a stopped state into a print state. Immediately after the activating operation is completed, the image forming part starts an image forming operation (1) corresponding to the print request (1).

In the example shown in FIG. 14, the image forming part receives a print request (2) in the middle of the image forming operation (1) being performed. Thus, immediately after the image forming operation (1) is completed, an image forming operation (2) corresponding to the subsequent print request (2) is started. Thereafter, the image forming part receives a print request advance notice (3) for a subsequent print request in the middle of the image forming operation (2). In this example, only when the print request advance notice is issued, the deactivating operation is not performed at a time when the image forming operation (2) is ended and the image forming mechanism is caused to standby in an operating state for a predetermined set time. If there is no print request advance notice until the image forming operation is ended, an activating operation of the image forming mechanism is performed after the image forming operation is ended.

Then, since a new print request is to be issued within the standby time, the image forming apparatus waits for a subsequent print request (3). However, for a case where a subsequent print request is not issued due to a generation of an abnormality such as an error, a predetermined time period is set to the standby time. If there is no new print request received during the standby time, the deactivating operation of the image forming mechanism is started when the set time is reached to stop the operation of the image forming mechanism (refer to FIG. 13). According to this operation, unnecessary energy consumption of the image forming part can be eliminated. Since it is preferable to permit change and adjustment of the above-mentioned standby time in accordance with the use condition of the image forming apparatus, it may be configured and arranged to allow reception of a setting instruction by a user by using the same means as mentioned in the section <Setting and changing a condition of standby operation>.

Additionally, because the main controller or the print request management part detects occurrence of an abnormality such as an error, the main controller or the print request management part has means for notifying the image forming part of a judgment that a print request cannot be issued since the job for which print request advance notice has been issued cannot be processed due to the detected abnormality. Upon reception of the notification of occurrence of an abnormality, the image forming part interrupts the standby operation and starts the deactivating operation of the image forming mechanism to stop the operation of the image forming mechanism. According to the operation in response to an occurrence of an abnormality, unnecessary energy consumption of the image forming part during the standby operation can be eliminated.

During the deactivating operation of the image forming mechanism after the standby time has passed and after the standby operation is interrupted, even if a new print request is received, a deactivating operation is not interrupted and continues until the image forming mechanism is stopped completely as is the same as the above-mentioned continuous image forming operation (I).

On the other hand, when the subsequent print request (3) is received during the standby time as noticed in advance, the image forming operation (3) corresponding to the print request (3) is started immediately as shown in FIG. 14. Thereafter, if there is no subsequent print request or no print request advance notice received in the middle of the image forming operation (3), a deactivating operation is started at the time when the image forming operation (3) is ended to stop the image forming mechanism. That is, the operation of the image forming part is controlled so that when the image forming operation (3) is ended, the deactivating operation of the image forming mechanism is started immediately so as to stop the image forming mechanism.

As mentioned above, according to the control operation shown in FIG. 14, the advance notice of an image forming request (the print request advance notice) is issued before the image forming request (print request) is issued when it is assumed that the image forming request (print request) cannot be issued at a timing at which a normal continuous image forming operation can be performed. Based on the advance notification, the image forming part is caused to start the standby operation while the operating state is maintained. Thus, the image forming operation can be started immediately in response to the subsequent image forming request (subsequent print request) when the advance notice has been received. Additionally, if there is no advance notice received, the standby operation is not performed (canceled). Thus, unnecessary operation is not performed, and unnecessary energy consumption of the image forming part is minimized and a high-speed process is achieved.

<Continuous Image Forming Operation (III) with a Setting of a Standby Time>

A description will now be given, with reference to FIG. 15, of another control operation according to a continuous image forming operation that permits setting of a standby time. Similar to FIGS. 12, 13 and 14, FIG. 15 shows a relationship between a timing of sequentially receiving a plurality of print requests and an operating state of the image forming mechanism of the image forming part.

In this example, the print request management part issues a print request in the same manner as in the above-mentioned continuous image forming operation (I). The print request management part notifies the image forming part of a processing status of the image forming data. The notification of the processing status of the image forming data is to inform that there is a subsequent print request even when it takes a long time to process the image forming data and the subsequent print request cannot be issued at a timing at which a normal operation can be performed. This notice is issued in response to a query sent to the image processing control part at a time of ending the image forming operation currently being performed as to whether the subsequent image forming data is being processed. Based on the reception of the notice indicating that the subsequent image forming data is being processed, the standby operation causes the image forming part to start the standby operation while maintaining the operating state and the image forming part waits for the issuance of the subsequent print request.

Figure 15:
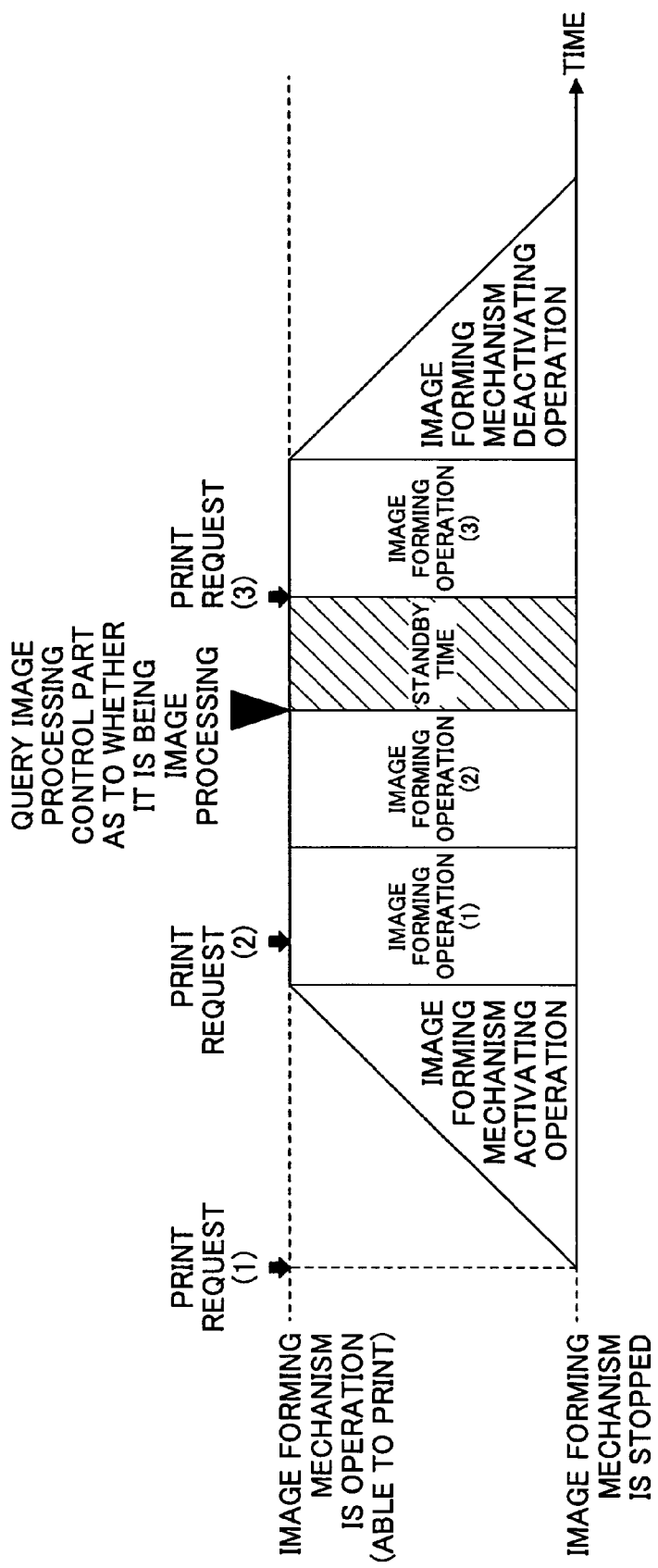
FIG. 15 is a time chart of yet another example of the image forming operation performed by the image forming part according to the third embodiment of the present invention.

As shown in FIG. 15, when the image forming part, which is in a state where the image forming mechanism therein is stopped, receives a print request (1) issued from the print request management part, the image forming part starts an activating operation to activate the image forming mechanism into change from a stopped state into a print state. Immediately after the activating operation is completed, the image forming part starts an image forming operation (1) corresponding to the print request (1).

In the example shown in FIG. 15, the image forming part receives a print request (2) in the middle of the image forming operation (1) being performed. Thus, immediately after the image forming operation (1) is completed, an image forming operation (2) corresponding to the subsequent print request (2) is started. Thereafter, in the case shown in FIG. 15, at a timing at which the image forming operation (2) is ended while a subsequent print request is not received, the image forming part queries the print request management part whether or not the subsequent image forming data is being processed by the image processing control part. In response to the query, the print request management part checks with the image processing control part, and notifies the image forming part of a result of the check. A mark ▼ in FIG. 15 indicates that the querying operation is performed at a time at which the image forming operation (2) is ended.

In the case shown in FIG. 15, only when the notification that the subsequent image forming data is being processed is received in response to the query, the deactivating operation of the image forming mechanism is not performed at the time when the image forming operation (2) is ended, and the image forming mechanism is caused to stand by while in the operating state. Additionally, if there is no notification that the subsequent image forming data is being processed in response to the query and it cannot be confirmed that the image forming data is being processed, an activating operation of the image forming mechanism is performed immediately after the image forming operation (2) is ended, which is different from the operation example of FIG. 15.

Then, because a new print request is to be issued within the standby time, the image forming apparatus waits for a subsequent print request (3). However, there may be a case where a subsequent print request is not issued due to a generation of an abnormality such as an error, and a predetermined time period is set to the standby time. If there is no new print request received during the standby time, different from the operation example shown in FIG. 15, the deactivating operation of the image forming mechanism is started when the set time is reached to stop the operation of the image forming mechanism (refer to FIG. 13). According to this operation, unnecessary energy consumption of the image forming part is eliminated. Because it is preferable to permit change and adjustment of the above-mentioned standby time in accordance with the use condition of the image forming apparatus, the image forming apparatus may be configured and arranged to allow reception of a setting instruction by a user by using the same means as mentioned in the <Setting and changing a condition of standby operation>.

Additionally, since the main controller or the print request management part detects occurrence of an abnormality such as an error, the main controller or the print request management part notifies the image forming part of a judgment that a print request cannot be issued because the subsequent image forming data of which processing status has been confirmed cannot be processed as scheduled due to the detected abnormality.

Upon reception of the notification of an occurrence of an abnormality, the image forming part interrupts the standby operation and, opposed to the operation example shown in FIG. 15, starts the deactivating operation of the image forming mechanism to stop the operation of the image forming mechanism. According to the operation in response to occurrence of an abnormality, unnecessary energy consumption of the image forming part during the standby operation can be eliminated.

During the deactivating operation of the image forming mechanism after the standby time has passed and after the standby operation is interrupted, even if a new print request is received, a deactivating operation is not interrupted and continues until the image forming mechanism is stopped completely which is the same as the above-mentioned continuous image forming operation (I).

On the other hand, when the subsequent image forming data is actually processed as confirmed by the query to the image processing control part and the subsequent print request (3) is issued during the standby time, the image forming operation (3) corresponding to the print request (3) is started immediately as shown in FIG. 15. Thereafter, if there is no subsequent print request issued in the middle of the image forming operation (3) or if the image processing of the subsequent job cannot be confirmed when the image forming operation (3) is ended, a deactivating operation is started at the time when the image forming operation (3) is ended so as to stop the image forming mechanism. That is, the operation of the image forming part is controlled so that when the image forming operation (3) is ended, the deactivating operation of the image forming mechanism is started immediately to stop the image forming mechanism.

As mentioned above, according to the control operation shown in FIG. 15, the notification of a processing status of the image forming data is received even when the image forming request (print request) is not issued at a timing at which a normal continuous image forming operation can be performed. Based on the notification indicating that the subsequent image forming data is being processed, the image forming part is caused to start the standby operation while the operating state is maintained. Thus, the image forming operation can be started immediately in response to the image forming request (print request) issued for the subsequent image forming data that was being processed.

Additionally, if the subsequent image forming data is not being processed, the standby operation is not performed (canceled). Thus, an unnecessary operation is not performed, unnecessary energy consumption of the image forming part is minimized and a high-speed process is achieved.

The present invention is not limited to the specifically disclosed embodiments, and variations and modifications may be made without departing from the scope of the present invention.

The present application is based on Japanese priority applications No. 2006-337573 filed Dec. 14, 2006 and No. 2007-017937 filed Jan. 29, 2007, the entire contents of which are hereby incorporated herein by reference.

What is claimed is:

1. An image forming apparatus comprising:
an image forming part that performs an image forming operation;
a higher-order component that sends an image forming request to perform the image forming operation of said image forming part; and
a control part that controls said image forming part based on the image forming request received from said higher-order component,
wherein said control part controls said image forming part to perform a deactivation standby operation to stand by for a predetermined time while said image forming part is continuously set in an operating state after said image forming part completed the image forming operation, without querying said higher-order component about an image forming operation to be performed subsequently,
wherein said higher-order component includes an image processing control part that generates image forming data by processing image data received from an external apparatus connected through a network,
wherein, before the processing of the received image data is completed, said image processing control part notifies said control part of time information regarding a time needed to process the image data to generate the image forming data, and
wherein said image processing control part issues an advance notice indicating an issuance of an image forming request to said control part before issuing the image forming request corresponding to image forming data requiring a processing time longer than a time required by an image forming operation currently being performed, and said control part starts an operation to cause said image forming part to stand by while being in an operating state under a condition of issuance of the advance notice.

2. The image forming apparatus as claimed in claim 1, wherein said predetermined time is determined based on information regarding an image processing time taken by said higher-order component.

3. The image forming apparatus as claimed in claim 1, wherein said predetermined time can be set to an arbitrary value based on an instruction supplied to said forming apparatus.

4. The image forming apparatus as claimed in claim 1, wherein said deactivation standby operation is cancelled when a predetermined value is set to said predetermined time.

5. The image forming apparatus as claimed in claim 1, wherein said image processing control part notifies said control part of the time information when the time needed to process the image data is longer than said predetermined time.

6. The image forming apparatus as claimed in claim 1 wherein said control part determines said predetermined time in accordance with the time information.

7. The image forming apparatus as claimed in claim 1, wherein said control part is capable of cancelling execution of said deactivation standby operation in accordance with the time information.

8. The image forming apparatus as claimed in claim 1, wherein said control part causes said image forming part to start a deactivating operation when a predetermined time has passed in a state where no image forming request is received from said image processing control part.

9. The image forming apparatus as claimed in claim 8, further comprising an operation unit that can set an arbitrary value to said predetermined time.

10. The image forming apparatus as claimed in claim 1, wherein when said image processing control part interrupts image processing due to an occurrence of an abnormality after sending the advance notice, said image processing control part notifies said control part that the image processing is interrupted, and said control part causes said image forming part to perform a deactivating operation under a condition of reception of a notification indicating the interruption of the image processing.

11. The image forming apparatus as claimed in claim 1, wherein said control part checks whether said image processing control part is performing image processing to cause said image forming part to stand by while being maintained in an operating state under a condition that image processing of subsequent image forming data is confirmed by the check after the image forming operation being performed is ended.

12. The image forming apparatus as claimed in claim 11, wherein said control part causes said image forming part to start a deactivating operation under a condition that processing of subsequent image forming data is not confirmed after the image forming operation being performed is ended.

13. The image forming apparatus as claimed in claim 11 wherein said control part causes said image forming part to start a deactivating operation when said image forming part is caused to stand by for a predetermined time in a state where no image forming request is received from said image processing control part.

14. The image forming apparatus as claimed in claim 13, further comprising an operation unit that can set an arbitrary value to said predetermined time.

15. The image forming apparatus as claimed in claim 11, wherein when said image processing control part interrupts image processing due to an occurrence of an abnormality after sending a notification indicating that subsequent image forming data is being processed, said image processing control part notifies said control part that the image processing is interrupted, and said control part causes said image forming part to perform a deactivating operation under a condition of reception of the notification indicating the interruption of the image processing.

* * * * *